(12) United States Patent
Kikuchi (10) Patent No.: US 7,965,224 B2
(45) Date of Patent: Jun. 21, 2011

(54) RUNNING CONTROL SYSTEM FOR VEHICLE

(75) Inventor: Hayato Kikuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 253 days.

(21) Appl. No.: 12/276,773

(22) Filed: Nov. 24, 2008

(65) Prior Publication Data

US 2009/0135049 A1    May 28, 2009

(30) Foreign Application Priority Data

Nov. 27, 2007  (JP) ................................. 2007-305475

(51) Int. Cl.
*G01S 13/00* (2006.01)

(52) U.S. Cl. ................. 342/70; 342/54; 342/82; 342/85

(58) Field of Classification Search .............. 342/70–72, 342/82, 85, 52, 54
See application file for complete search history.

(56) References Cited

U.S. PATENT DOCUMENTS

| | | | |
|---|---|---|---|
| 5,654,715 A * | 8/1997 | Hayashikura et al. .......... | 342/70 |
| 5,731,779 A * | 3/1998 | Kikuchi ........................... | 342/70 |
| 5,748,141 A * | 5/1998 | Hoess ............................ | 342/109 |
| 5,861,836 A * | 1/1999 | Hoss ............................... | 342/70 |
| 6,134,497 A * | 10/2000 | Hayashi et al. ................ | 701/70 |
| 6,179,080 B1 * | 1/2001 | Kikuchi ......................... | 180/169 |
| 6,369,700 B1 * | 4/2002 | Yamada ......................... | 340/435 |
| 6,580,385 B1 * | 6/2003 | Winner et al. .................. | 342/70 |
| 6,583,753 B1 * | 6/2003 | Reed ............................... | 342/70 |
| 6,617,999 B2 * | 9/2003 | Kondo et al. ................... | 342/70 |
| 6,825,756 B2 * | 11/2004 | Bai et al. ........................ | 340/435 |
| 6,844,842 B2 * | 1/2005 | Kroeger et al. ................ | 342/70 |
| 6,859,716 B2 * | 2/2005 | Kikuchi .......................... | 701/96 |
| 6,879,281 B2 * | 4/2005 | Gresham et al. ............... | 342/70 |
| 7,109,915 B2 * | 9/2006 | Kurodai et al. ................ | 342/82 |
| 7,136,013 B2 * | 11/2006 | Hanawa et al. ................ | 342/70 |
| 7,218,208 B2 * | 5/2007 | Kikuchi .......................... | 340/435 |
| 7,321,818 B2 * | 1/2008 | Michi et al. .................... | 701/96 |
| 7,667,636 B2 * | 2/2010 | Kikuchi .......................... | 342/70 |
| 2003/0112172 A1 * | 6/2003 | Shinoda et al. ................ | 342/70 |
| 2003/0135318 A1 * | 7/2003 | Tellis et al. .................... | 701/96 |
| 2003/0151541 A1 * | 8/2003 | Oswald et al. ................. | 342/70 |
| 2003/0193430 A1 * | 10/2003 | Gresham et al. .............. | 342/70 |
| 2004/0164892 A1 * | 8/2004 | Shinoda et al. ............... | 342/107 |
| 2005/0150701 A1 * | 7/2005 | Michi et al. ................... | 180/170 |

(Continued)

FOREIGN PATENT DOCUMENTS

JP          62-259111 A       11/1987

(Continued)

*Primary Examiner* — Thomas H Tarcza
*Assistant Examiner* — Peter Bythrow
(74) *Attorney, Agent, or Firm* — Arent Fox LLP (57) ABSTRACT

A running control system having a radar device that detects a distance between a subject vehicle and a preceding vehicle. When a vehicle speed sensor detects the subject vehicle has stopped, a transmission output controller sets a transmission output of the radar device to a stopping time transmission output lower than a running time transmission output. When the radar device detects an increase in the distance between the subject vehicle and the preceding vehicle while the subject vehicle is stopped, or when the distance between the subject vehicle and the preceding vehicle detected by the radar device while the subject vehicle has stopped is longer than a predetermined value, a notifying device notifies an occupant of the subject vehicle that following running control is possible.

14 Claims, 10 Drawing Sheets

U.S. PATENT DOCUMENTS

2005/0174222 A1* 8/2005 Kikuchi .................. 340/435
2005/0267684 A1* 12/2005 Kawakami et al. ........... 701/301

FOREIGN PATENT DOCUMENTS

| | | |
|---|---|---|
| JP | 64-057188 A | 3/1989 |
| JP | 3-68126 U | 7/1991 |
| JP | 08-276806 A | 10/1996 |
| JP | 11-066499 A | 3/1999 |
| JP | 11-084000 | 3/1999 |
| JP | 11-271452 A | 10/1999 |
| JP | 2000-43618 A | 2/2000 |
| JP | 2000-313247 A | 11/2000 |
| JP | 2000-314774 A | 11/2000 |
| JP | 3261345 B2 | 12/2001 |
| JP | 2005-231490 A | 9/2005 |
| JP | 2005-343259 A | 12/2005 |
| JP | 2006-021578 A | 1/2006 |

* cited by examiner

FIG.5A TIME-1: RUNNING FOLLOWING PRECEDING VEHICLE TO STOP
MOVE→STOP
POWER-UP MODE

FIG.5B TIME-2: BOTH PRECEDING VEHICLE AND SUBJECT VEHICLE ARE STOPPING
STOP
STOP
POWER-DOWN MODE

FIG.5C TIME-3: PRECEDING VEHICLE STARTS TO MOVE
START TO MOVE
STOP

FIG.5D TIME-4: PRECEDING VEHICLE CONTINUE MOVING
CONTINUE MOVING
STOP

FIG.5E TIME-5: PRECEDING VEHICLE CONTINUE MOVING, START SWITCH IS PRESSED
CONTINUE MOVING
START TO FOLLOW

FIG.9A
TIME-1: RUNNING FOLLOWING PRECEDING VEHICLE TO STOP

MOVE→STOP
POWER-UP MODE

FIG.9B
TIME-2: BOTH PRECEDING VEHICLE AND SUBJECT VEHICLE ARE STOPPING

STOP
STOP
POWER-DOWN MODE

FIG.9C
TIME-3: PRECEDING VEHICLE STARTS TO MOVE

START TO MOVE
STOP→MINUTE MOVEMENT

FIG.9D
TIME-4: PRECEDING VEHICLE CONTINUE MOVING

CONTINUE MOVING
MINUTE MOVEMENT
→START TO FOLLOW

FIG.9E
TIME-5: PRECEDING VEHICLE CONTINUE MOVING, START SWITCH IS PRESSED

CONTINUE MOVING
FOLLOWING

TIME-1: RUNNING FOLLOWING PRECEDING VEHICLE TO STOP

FIG.10A

TIME-2: BOTH PRECEDING VEHICLE AND SUBJECT VEHICLE ARE STOPPING

FIG.10B

TIME-3: PRECEDING VEHICLE STARTS TO MOVE

FIG.10C

TIME-4: PRECEDING VEHICLE CONTINUE MOVING

FIG.10D

TIME-5: PRECEDING VEHICLE CONTINUE MOVING, START SWITCH IS PRESSED

FIG.10E

RUNNING CONTROL SYSTEM FOR VEHICLE

CROSS-REFERENCE TO RELATED APPLICATIONS

This application is based upon and claims the benefit of priority from the prior Japanese Patent Application No. 2007-305475, filed Nov. 27, 2007, the entire contents of which is incorporated herein by reference.

BACKGROUND OF THE INVENTION

1. Field of the Invention

The present invention relates to a running control system for a vehicle.

2. Description of the Related Art

Radar devices that use a laser beam as a detection medium may affect eyesight of pedestrians or the like if the laser beam is applied to their eyes for a predetermined time or more. For this reason, a device that reduces a transmission output of a laser beam while a vehicle is stopped is disclosed in Japanese Patent No. 3261345.

In some countries, it is mandatory to reduce a transmission output of a laser beam while a vehicle has stopped. Also, even without the legal regulations of such countries being a concern, cooling of a radar device with running air cannot be accomplished while the vehicle is stopped. Thus, the radar device may overheat and have a reduced durability while the vehicle is stopped unless a transmission output of the laser beam is reduced to be lower than when operating during a normal state.

However, for a vehicle having a congestion following system which starts and stops the subject vehicle according to the starting and stopping of a preceding vehicle in heavy traffic, if a transmission output of a radar device is reduced during stoppage of the subject vehicle, the radar device with the reduced transmission output is prone to lose sight of the preceding vehicle when a stopped preceding vehicle starts moving again and increases a distance between the subject vehicle and the preceding vehicle, which makes smooth following running control of the subject vehicle toward the preceding vehicle difficult.

Figure 10A:
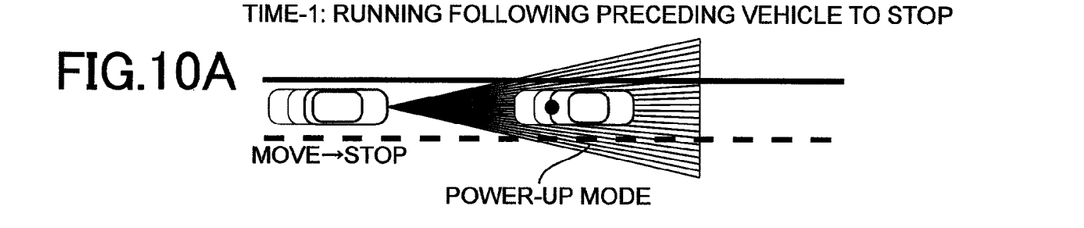
FIGS. 10A-10E illustrate operation at the start of following running control in a conventional system.
Figure 10B:
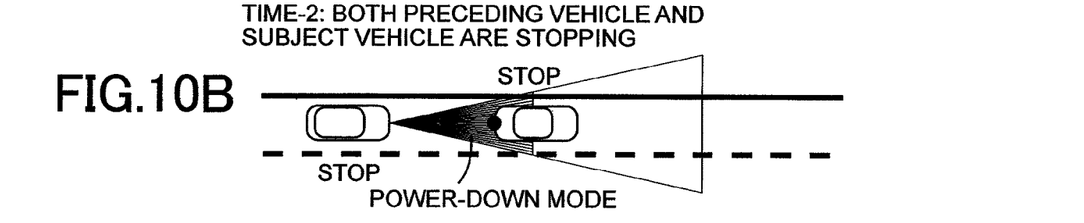
Figure 10C:
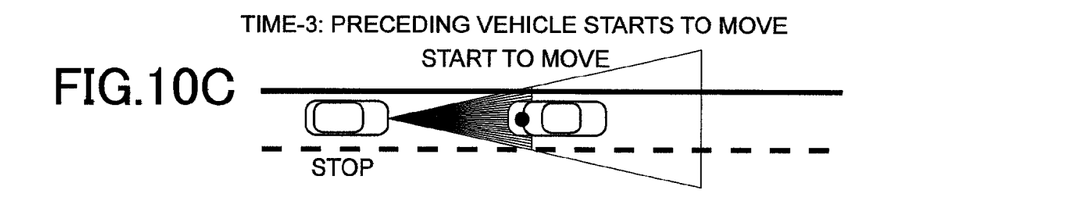
Figure 10D:
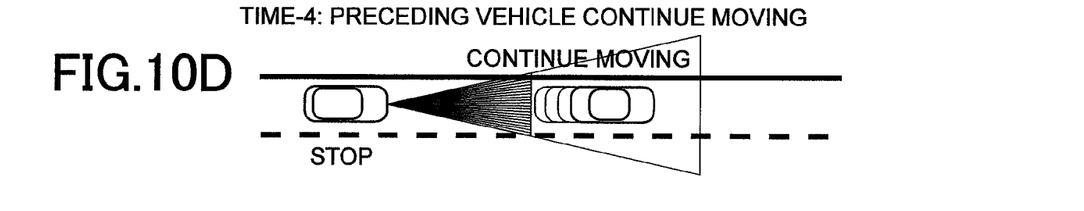
Figure 10E:
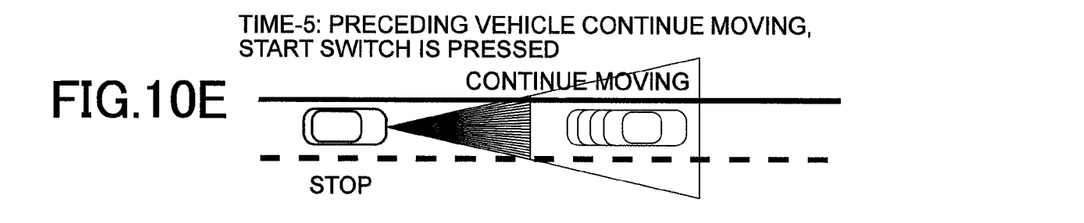

The aforementioned drawback in the related art system will be described in detail with reference to FIGS. 10A-10E. As shown in FIG. 10A, an output of the radar device of the subject vehicle is in a power-up mode until the subject vehicle approaches a stopped preceding vehicle and stops. The output of the radar device then enters a power-down mode when the subject vehicle stops, as shown in FIG. 10B. From this state, when the preceding vehicle starts to move again, as shown in FIG. 10C, the preceding vehicle moves beyond a short detectable range of the radar device while in the power-down mode, as shown in FIG. 10D. Thus, even if a driver of the subject vehicle slightly delays operating a start switch for the following running control, the subject vehicle may lose sight of the preceding vehicle, as shown in FIG. 10E, and prevent the radar device from switching to the following running control.

SUMMARY OF THE INVENTION

The present invention is achieved in view of the above described circumstances, and provides reliable following running control without losing sight of a preceding vehicle, even when an output of a radar device is reduced during stoppage of a subject vehicle.

In order to achieve such, the present invention provides a running control system for a vehicle. The running control system includes a radar device that is mounted in a subject vehicle and detects a distance between the subject vehicle and a preceding vehicle forward of the subject vehicle in an advancing direction; a vehicle speed sensor that detects a vehicle speed of the subject vehicle; transmission output control means for setting a transmission output of the radar device to a stopping time transmission output that is lower than a running time transmission output when the detected vehicle speed is lower than a predetermined threshold or value, which indicates a substantially stopped state; and following running control means for performing following running control toward the preceding vehicle on the basis of a detection result by the radar device. The system further includes notification means for notifying an occupant that the following running control is possible when the radar device detects an increase in the distance between the subject vehicle and the preceding vehicle during stoppage of the subject vehicle, or when the distance between the subject vehicle and the preceding vehicle detected by the radar device during stoppage of the subject vehicle is longer than a predetermined value, and the transmission output control means increases the transmission output of the radar device to a transmission output that is higher than the stoppage time transmission output after notification by the notification means.

The transmission output control means sets the transmission output of the radar device to a stopping time transmission output that is lower than the running time transmission output when the vehicle speed of the subject vehicle detected by the vehicle speed sensor is at or lower than the predetermined threshold that indicates the substantially stopped state. The notification means notifies the occupant that the following running control is possible when the radar device detects an increase in the distance between the subject vehicle and the preceding vehicle during stoppage of the subject vehicle, or when the distance between the subject vehicle and the preceding vehicle detected by the radar device during stoppage of the subject vehicle is greater than the predetermined value, and the transmission output control means increases the transmission output of the radar device to a transmission output that is higher than the stopping time transmission output. Thus, when the distance between the subject vehicle and the preceding vehicle allows the following running control toward the preceding vehicle by the following running control means, the transmission output of the radar device is increased to allow a reliable shift to the following running control without losing sight of the preceding vehicle.

The following running control means also performs minute distance movement control for advancing the subject vehicle a minute distance when the notification means performs the notification. The transmission output control means increases the transmission output of the radar device to a transmission output that is higher than the stopping time transmission output during the minute distance movement control.

The following running control means performs the minute distance movement control for advancing the subject vehicle a minute distance when the notification means indicates that the following running control is possible. The transmission output control means increases the transmission output of the radar device to a transmission output that is higher than the stopping time transmission output during the minute distance movement control. Even in a case where the transmission output of the radar device cannot be set to the running time transmission output during stoppage due to legal regulations, the transmission output is set to the running time transmission output by moving the subject vehicle a minute distance, which allows a shift to following running control without losing sight of the preceding vehicle.

The system further includes detection means for detecting a command operation for starting the following running control provided by the occupant. The following running control means starts the following running control toward the preceding vehicle when the command operation for starting the following running control provided by the occupant is detected within a predetermined time from the notification by the notification means.

When the detection means detects the command operation for starting the following running control provided by the occupant within the predetermined time from an indication by the notification means that the following running control is possible, the following running control means starts the following running control toward the preceding vehicle. Thus, the following running control is started before the distance between the subject vehicle and the preceding vehicle is increased to a point where the following running control is disabled.

The transmission output control means sets the transmission output of the radar device to the stopping time transmission output when the command operation for starting the following running control provided by the occupant is not detected within the predetermined time from an indication by the notification means.

When the detection means does not detect the command operation for starting the following running control provided by the occupant within the predetermined time from the indication by the notification means that the following running control is possible, the transmission output control means sets the transmission output of the radar device to the stopping time transmission output. As such, the transmission output of the radar device is prevented from being set to a higher running time transmission output than is necessary when the occupant does not intend to perform the following running control.

The transmission output control means sets the transmission output of the radar device to the stopping time transmission output at completion of the minute distance movement control, when the command operation for starting the following running control provided by the occupant is not detected during the minute distance movement control by the following running control means.

When the command operation for starting the following running control provided by the occupant is not detected by the following running control means during the minute distance movement control, the transmission output control means sets the transmission output of the radar device to the stopping time transmission output upon completion of the minute distance movement control. As such, the transmission output of the radar device is prevented from being set to a higher running time transmission output than necessary when the occupant does not intend to perform the following running control.

A start switch Sd in the embodiments described below corresponds to the detection means in the present invention.

Embodiments of the present invention will now be described with reference to the accompanying drawings.

DESCRIPTION OF THE PREFERRED EMBODIMENTS

Figure 1:
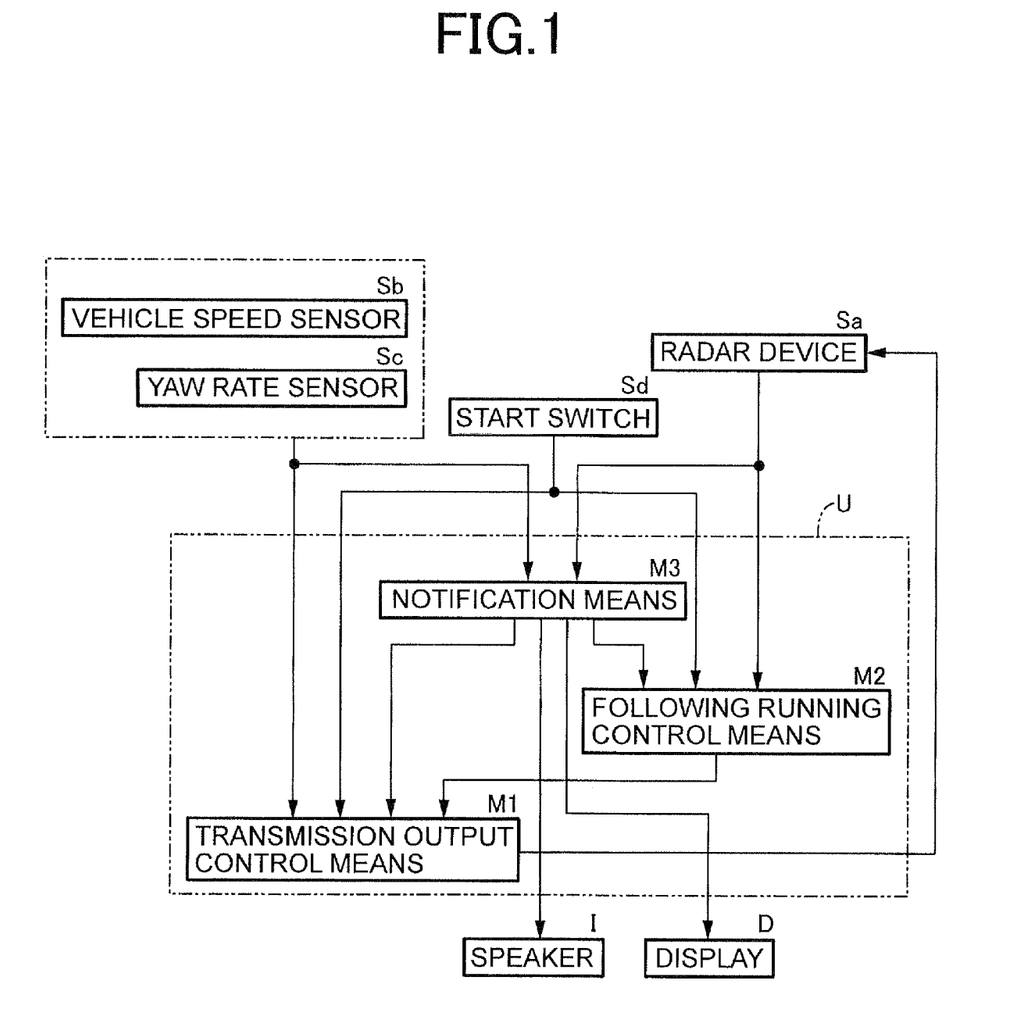
FIG. 1 is a block diagram of an electronic control unit of a running control system of a vehicle.

As shown in FIG. 1, the running control system, according to an embodiment of the present invention, includes a radar device Sa that detects a preceding vehicle and is provided at a front end of a subject vehicle, performs adaptive cruise control (ACC), which includes allowing following running control to run following the preceding vehicle while keeping a certain distance between the subject vehicle and the preceding vehicle when detecting the preceding vehicle, and performs constant speed running control at a preset vehicle speed when not detecting the preceding vehicle, and further performs congestion following control to automatically start and stop the subject vehicle according to a start and stop of the preceding vehicle when a driver of the subject vehicle presses a start switch Sd following the start of the preceding vehicle in heavy traffic.

An electronic control unit U of the running control system includes transmission output control means M1, following running control means M2, and notification means M3. A vehicle speed sensor Sb that detects a vehicle speed of the subject vehicle, a yaw rate sensor Sc that detects a yaw rate of the subject vehicle, a start switch Sd that initiates a start of the congestion following running control, the following running control means M2, and the notification means M3 are connected to the transmission output control means M1. The radar device Sa, the start switch Sd, and the notification means M3 are connected to the following running control means M2. The vehicle speed sensor Sb, the yaw rate sensor Sc, the radar device Sa, and a speaker I and a display D for notification to a driver are connected to the notification means M3.

The transmission output control means M1 determines that the subject vehicle is substantially stopped when the vehicle speed detected by the vehicle speed sensor Sb is equal to or less than a predetermined threshold or value, and the yaw rate detected by the yaw rate sensor Sc is equal to or less than a predetermined threshold or value, and switches a transmission output of the radar device Sa from a power-up mode (high output mode) during running to a power-down mode (low output mode) during stoppage. One reason therefor is that if the transmission output is in the power-up mode during stoppage when cooling of the radar device Sa with running air cannot be expected, the radar device Sa may overheat and reduce durability thereof. Another reason is that there is a case where it is mandatory to switch the transmission output to the power-down mode during stoppage to prevent a laser beam from being intensely applied to pedestrians at a short distance.

The transmission output control means M1 performs a function of switching the transmission output from the power-down mode to the power-up mode so as not to lose sight of the preceding vehicle when the stopped preceding vehicle starts to move at the beginning of the congestion following system control or when the subject vehicle stops a predetermined distance or more from the stopped preceding vehicle, thus allowing a smooth shift to the congestion following control without losing sight of the preceding vehicle.

The notification means M3 notifies the driver that the following running control toward the preceding vehicle is possible from a stop/running state of the preceding vehicle detected by the radar device Sa, and a stopped state of the subject vehicle detected by the vehicle speed sensor Sb and the yaw rate sensor Sc. The notification is conveyed from the speaker I and/or displayed on the display D.

The following running control means M2 starts the following running control toward the preceding vehicle on the basis of a stop/running state of the preceding vehicle detected by the radar device Sa, the start switch Sd operated by the driver to start congestion following control, and notification by the notification means M3 that the following running control is possible.

Functions of the transmission output control means M1, the following running control means M2, and the notification means M3 are described in more detail with reference to the flowcharts in the corresponding figures.

Figure 2:
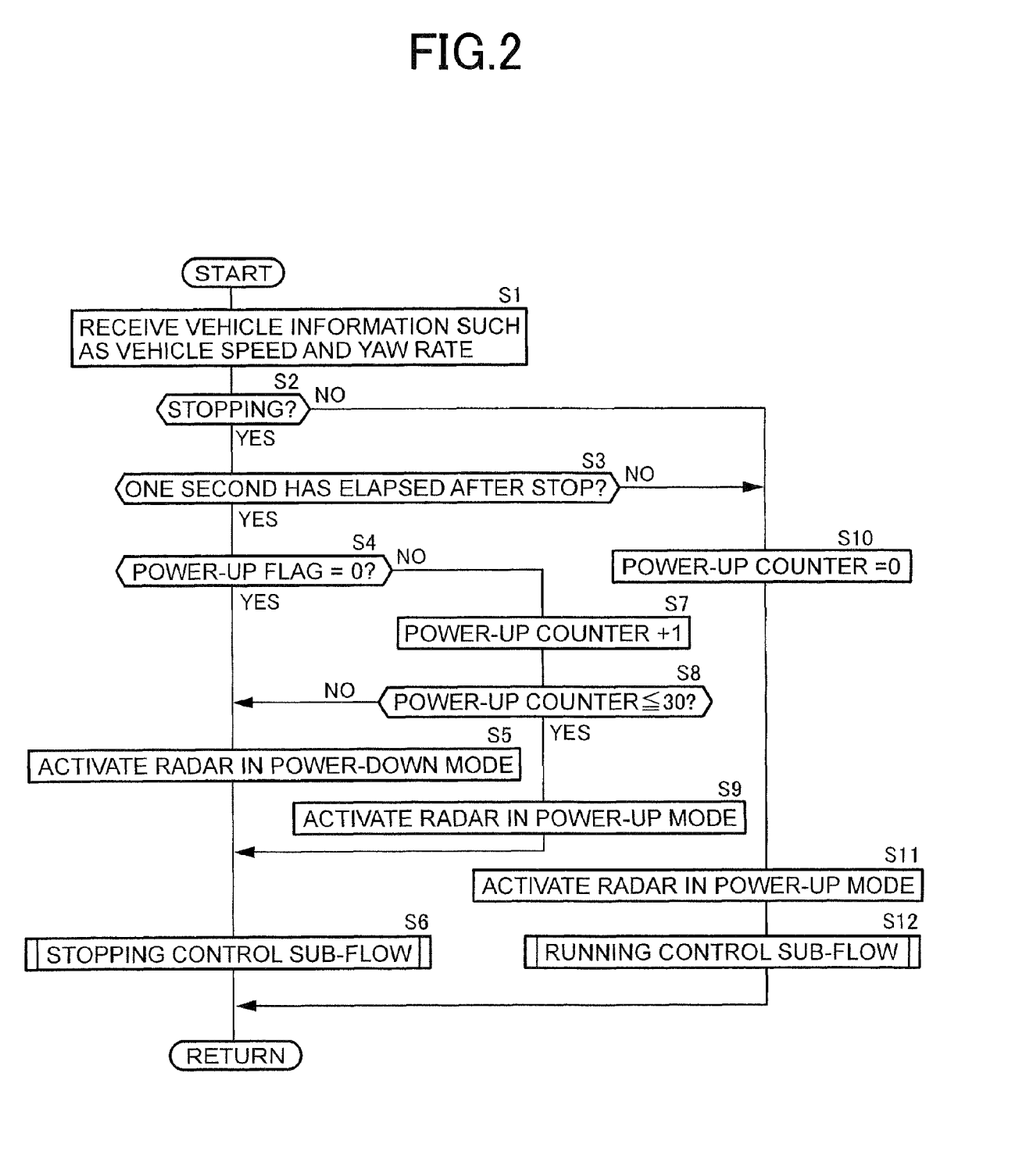
FIG. 2 is a flowchart of a main routine according to an embodiment of the present invention.

First, in Step S1 of the flowchart in FIG. 2, the vehicle speed sensor Sb and the yaw rate sensor Sc detect the vehicle speed and yaw rate of the subject vehicle. When at least one of the vehicle speed and yaw rate is not equal to or less than a threshold or value and it is determined that the subject vehicle is not stopped in Step S2, or when it is determined that the subject vehicle is stopped but one second has not elapsed after the subject vehicle has stopped in Step S3, that is, during running of the subject vehicle and within one second after the subject vehicle has stopped, a power-up counter described later is set to the count of 0 in Step S10. The radar device Sa is activated in a running output (high output power-up mode) in Step S11, and the process shifts to a running control subroutine described later in detail in Step S12. Specifically, the output of the radar device Sa is in the power-up mode during running of the subject vehicle and until one second elapses after running stops.

When the subject vehicle is stopped in Step S2, and the stopped state continues for one second in Step S3, a state of a power-up flag is checked in Step S4. The power-up flag indicates the state of the transmission output of the radar device Sa, and an initial value thereof is set to "0". The power-up flag="1" corresponds to the power-up mode, and the power-up flag="0" corresponds to the power-down mode. When the power-up flag="0" (power-down mode) in Step S4, the radar device Sa is activated in the power-down mode in Step S5, and the process shifts to a stopping control subroutine in Step S6.

When the power-up flag="1" (power-up mode) in Step S4, the power-up counter is incremented by one in Step S7. When the power-up counter reaches the count of 30 or less in Step S8, the radar device Sa is activated in the power-up mode in Step S9. When the power-up counter reaches the count of 31, the radar device Sa is activated in the power-down mode in Step S5, the process moves to Step S6 and shifts to the stopping control subroutine.

Specifically, when the power-up flag is the initial value of "0", the output immediately enters the power-down mode after one second elapses from when the subject vehicle stops, while after the power-up flag becomes "1", the output does not immediately enter the power-down mode even after one second elapses from the subject vehicle stopping, but first enters the power-down mode when the power-up counter reaches the count of 31.

Figure 3:
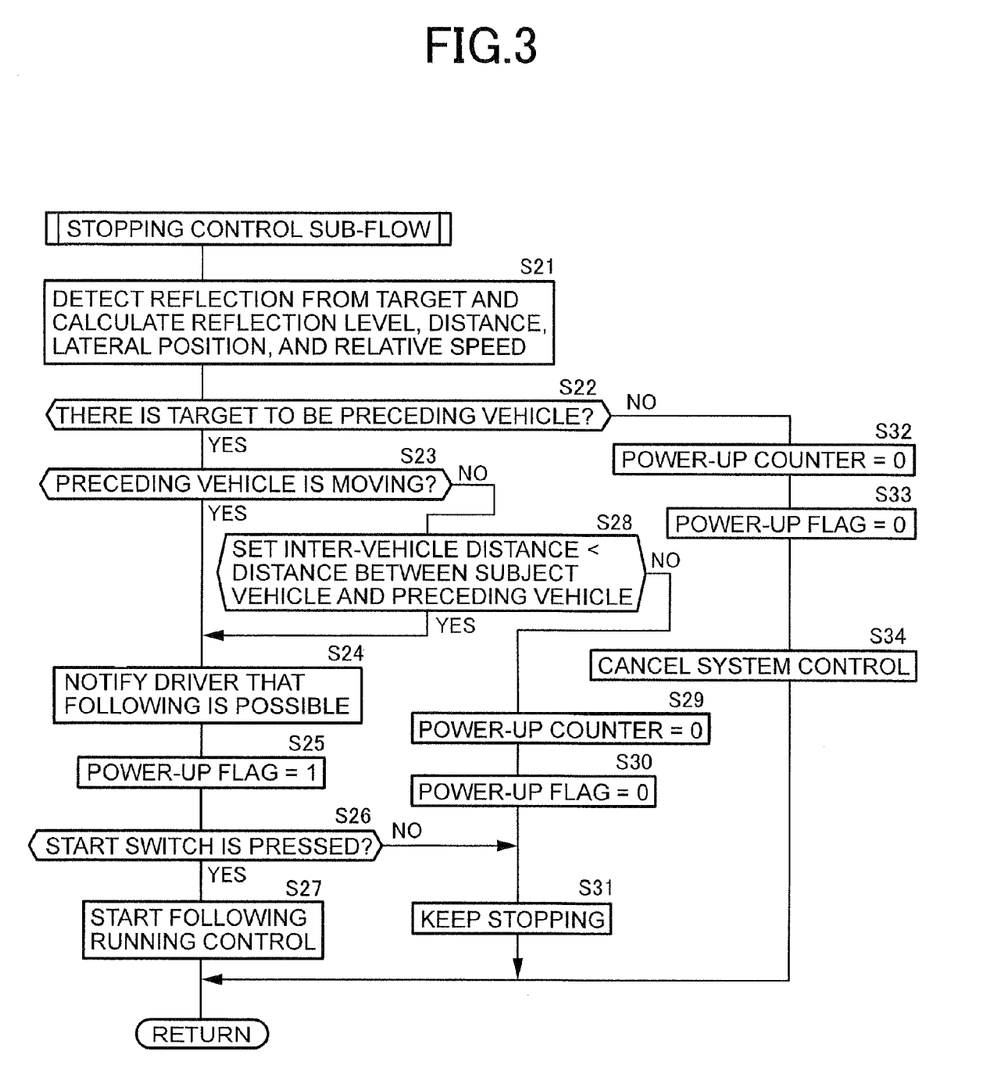
FIG. 3 is a flowchart of a subroutine of Step S6 from the main routine shown in FIG. 2.

In Step S21 of a flowchart in FIG. 3 showing details of Step S6 (stopping control subroutine), a reflected wave from a target vehicle is detected by the radar device Sa, and a reflection level, a distance, a lateral position, and a relative speed are calculated. Then, if there is no target vehicle that is to be the preceding vehicle in Step S22, the power-up counter is set to the count of 0 in Step S32, the power-up flag is set to "0" in Step S33, and system control is cancelled in Step S34.

When there is a target vehicle determined to be the preceding vehicle in Step S22, and the preceding vehicle is moving in Step S23, or when the preceding vehicle is not moving in Step S23 but the distance between the subject vehicle and the preceding vehicle exceeds a set inter-vehicle distance in Step S28, the driver is notified by the speaker I and/or the display D that the following running control toward the preceding vehicle is possible in Step S24, and the power-up flag is set to "1" in Step S25. Then, if the start switch Sd for the following running control is pressed in Step S26, the following running control toward the preceding vehicle is started in Step S27.

When the distance between the subject vehicle and the preceding vehicle is equal to or less than the set inter-vehicle distance in Step S28, the power-up counter is set to the count of 0 in Step S29, the power-up flag is set to "0" in Step S30, and the subject vehicle is kept in the stop state in Step S31. If the start switch Sd for the following running control is not pressed in Step S26, the subject vehicle is kept in the stopped state in Step S31.

Figure 4:
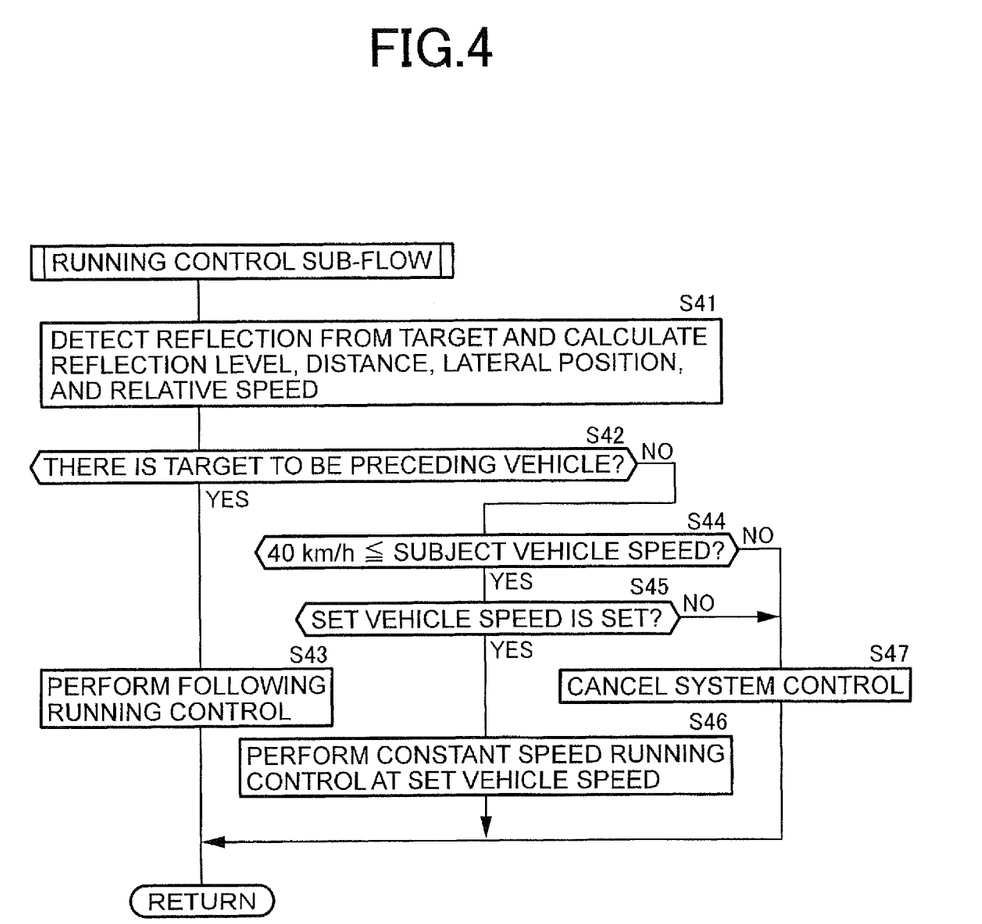
FIG. 4 is a flowchart of a subroutine of Step S12 from the main routine shown in FIG. 2.

In Step S41 of a flowchart in FIG. 4 showing details of Step S12 (running control subroutine), a reflected wave from a target vehicle is detected by the radar device Sa, and a reflection level, a distance, a lateral position, and a relative speed are calculated. Then, if there is a target vehicle to be the preceding vehicle in Step S42, the following running control toward the preceding vehicle is performed in Step S43. When there is no target vehicle to be the preceding vehicle in Step S42, if the vehicle speed of the subject vehicle is 40 km/h or higher in Step S44 and a set vehicle speed (target vehicle speed of constant speed running control) is set in Step S45, the constant speed running control is performed at the set vehicle speed in Step S46.

When there is no preceding vehicle in Step S42, and the vehicle speed of the subject vehicle is lower than 40 km/h in Step S44, or when the vehicle speed of the subject vehicle is 40 km/h or higher in Step S44, but the set vehicle speed is not set in Step S45, system control is cancelled in Step S47.

As described above, when the target vehicle is the preceding vehicle in Step S22 in FIG. 3, and the preceding vehicle is moving in Step S23, or when the preceding vehicle is not moving in Step S23 but the distance between the subject vehicle and the preceding vehicle exceeds the set inter-vehicle distance in Step S28, the driver is notified that the following running control toward the preceding vehicle is possible in Step S24, and the power-up flag is set to "1" in Step S25. Thus, the radar device Sa is activated in the power-up mode in Step S9 for a predetermined time (for example, three seconds) until the power-up flag is set to "1" in Step S4, as shown in FIG. 2, and the power-up counter reaches the count of 31 in Step S8.

Thus, even if there is a slight delay before the driver presses the start switch Sd for the following running control after the driver is notified that the following running control toward the preceding vehicle is possible, the power-up mode continues for the predetermined period of time, thereby avoiding a situation where the radar device Sa loses sight of the preceding vehicle, which would prevent a smooth shift to the following running control.

When the driver does not press the start switch Sd for the following running control upon the predetermined time lapsing after the driver has been notified that the following running control toward the preceding vehicle is possible, a conclusion can be drawn that the driver does not intend to perform the following running control. In this case, the output returns to the power-down mode after the lapse of the predetermined time unless the subject vehicle starts, thereby preventing the radar device Sa from unnecessarily continuing the power-up mode.

The above described operation will be further described with reference to the illustration of operation in FIGS. 5A-5E.

Figure 5A:
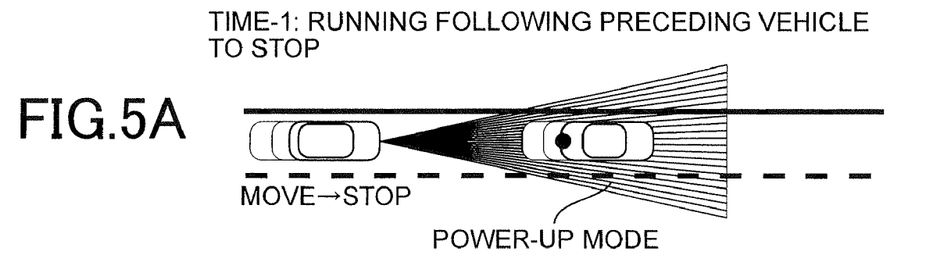
FIGS. 5A-5E illustrate operation at the start of following running control.
Figure 5B:
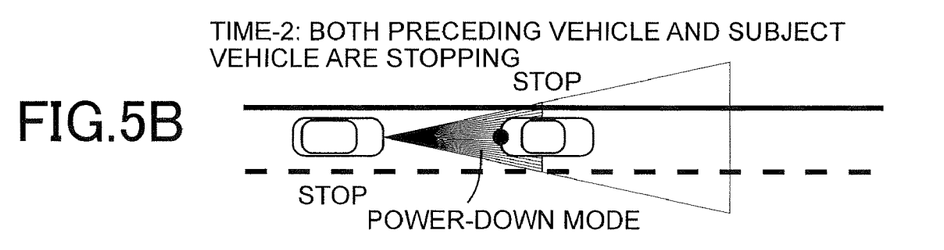
Figure 5C:
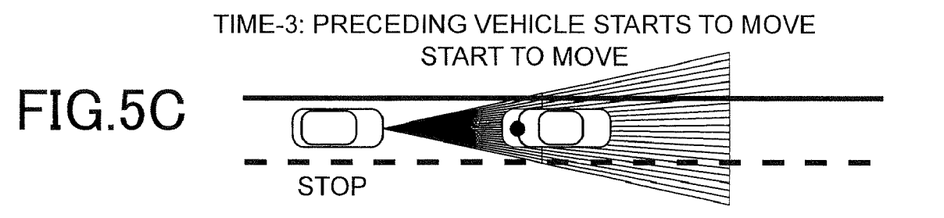
Figure 5D:
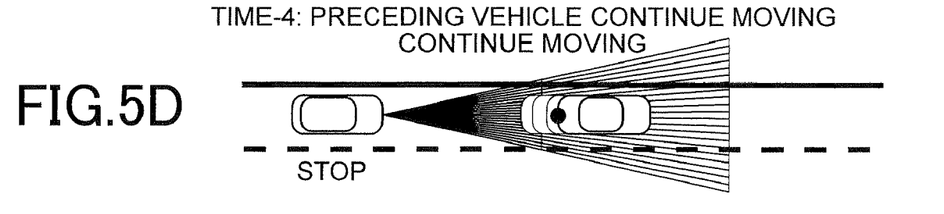
Figure 5E:
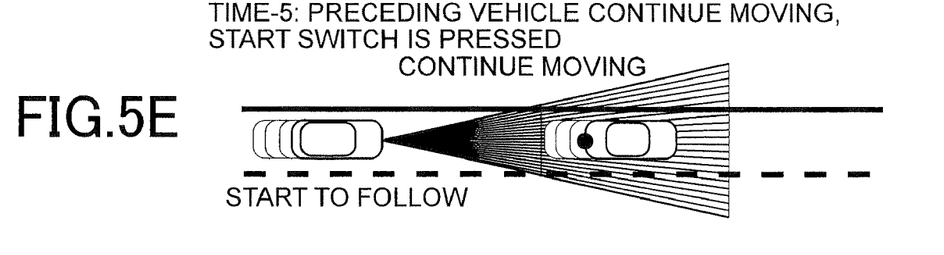

Referring to FIG. 5A, the output of the radar device Sa of the subject vehicle is in the power-up mode until the subject vehicle approaches the stopped preceding vehicle and stops. When the subject vehicle stops, as shown in FIG. 5B, the output of the radar device Sa enters the power-down mode. These steps are the same as in the conventional example described with reference to FIGS. 10A-10E. From this state, when the preceding vehicle starts, as shown in FIG. 5C, the output immediately shifts from the power-down mode to the power-up mode. Thus, the subject vehicle does not lose sight of the preceding vehicle, as shown in FIG. 5D. Thus, even if there is a slight delay before the driver presses the start switch Sd for the following running control after the preceding vehicle starts, the control reliably shifts to the following running control toward the preceding vehicle, as shown in FIG. 5E.

FIGS. 6 to 9 show a second embodiment of the present invention.

The first embodiment can be applied when the transmission output of the radar device Sa is set to the power-up mode during stoppage of the subject vehicle under legal regulations, but cannot be applied when it is mandatory to set the transmission output of the radar device Sa to the power-down mode during stoppage of the subject vehicle. The second embodiment is a measure for the case where it is mandatory to set the transmission output of the radar device Sa to the power-down mode during stoppage of the subject vehicle.

Figure 6:
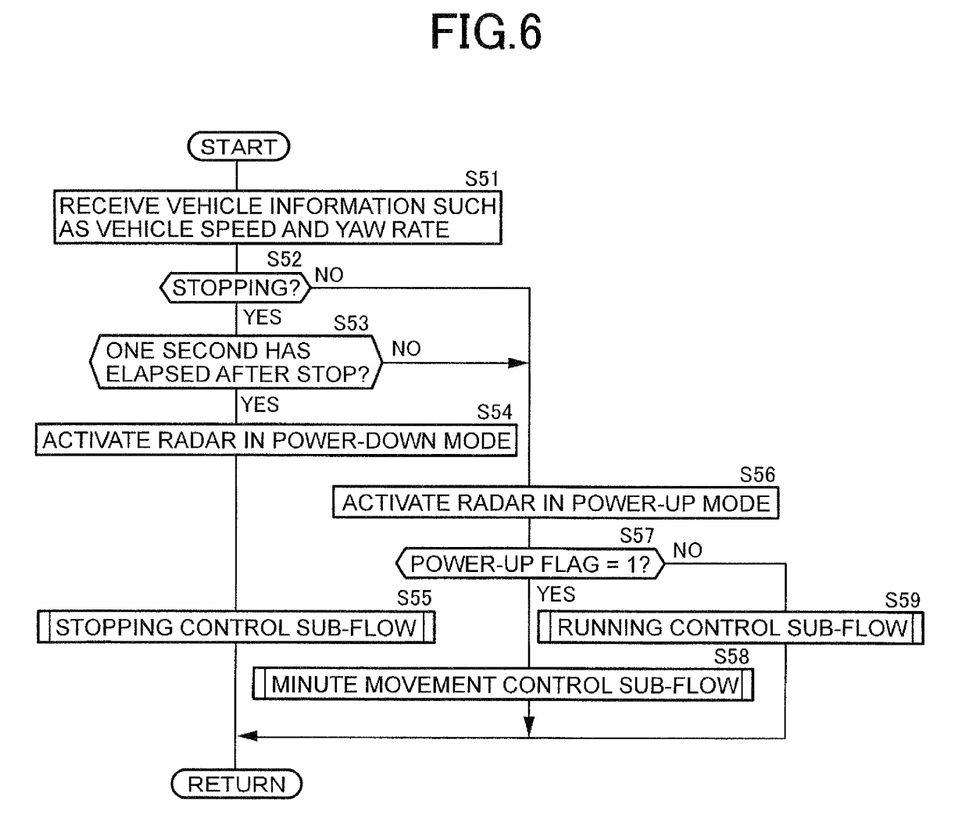
FIG. 6 is a flowchart of a main routine according to another embodiment of the present invention.

First, in Step S51 of FIG. 6, the vehicle speed sensor Sb and the yaw rate sensor Sc detect the vehicle speed and the yaw rate of the subject vehicle. When both the vehicle speed and the yaw rate are equal to or less than a predetermined threshold or value, and it is determined that the subject vehicle is stopping in Step S52, and one second has elapsed after the stop in Step S53, the radar device Sa is activated in the power-down mode in Step S54, and the process shifts to a stopping control subroutine in Step S55.

When at least one of the vehicle speed and the yaw rate is not equal to or less than the predetermined threshold or value and it is determined that the subject vehicle is not stopping in Step S52, or when it is determined that the subject vehicle is stopping but one second has not elapsed after the stop in Step S53, the radar device Sa is activated in the power-up mode in Step S56. When the power-up flag is "1" in Step S57, the process shifts to a minute movement control subroutine in Step S58. When the power-up flag is not "1", the process shifts to a running control subroutine in Step S59.

Figure 7:
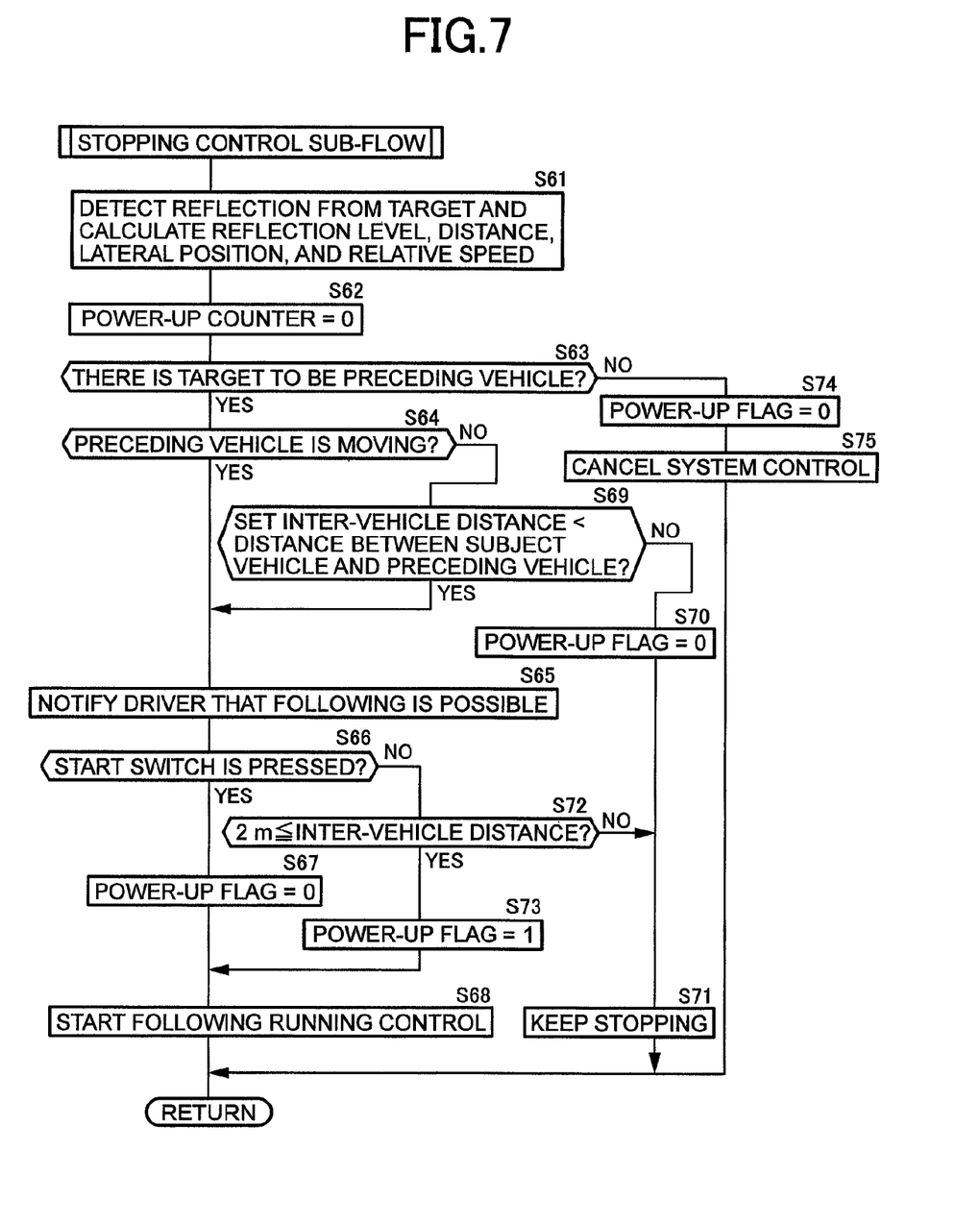
FIG. 7 is a flowchart of a subroutine of Step S55 from the main routine shown in FIG. 6.

In Step S61 of FIG. 7 showing details of Step S55 (stopping control subroutine), a reflected wave from a target vehicle is detected by the radar device Sa, and a reflection level, a distance, a lateral position, and a relative speed are calculated, and the power-up counter is set to the count of 0 in Step S62. Then, if there is no target vehicle that can be the preceding vehicle in Step S63, the power-up flag is set to "0" in Step S74, and system control is cancelled in Step S75.

When there is a target vehicle that can be the preceding vehicle in Step S63 and the preceding vehicle is moving in Step S64, or when the preceding vehicle is not moving in Step S64 but the distance between the subject vehicle and the preceding vehicle exceeds a set inter-vehicle distance in Step S69, the driver is notified that the following running control toward the preceding vehicle is possible in Step S65. Then, if the start switch Sd for the following running control is pressed in Step S66, the power-up flag is set to "0" in Step S67, and the following running control toward the preceding vehicle is started in Step S68.

When the distance between the subject vehicle and the preceding vehicle is the set inter-vehicle distance or longer in Step S69, the power-up flag is set to "0" in Step S70, and the subject vehicle is kept in the stop state in Step S71. When the start switch Sd is not pressed in Step S66, and the distance between the subject vehicle and the preceding vehicle is 2 m or longer in Step S72, the power-up flag is set to "1" in Step S73, and the following running control is started in Step S68. When the distance between the subject vehicle and the preceding vehicle is not 2 m or longer in Step S72, the subject vehicle is kept in the stop state in Step S71.

Figure 8:
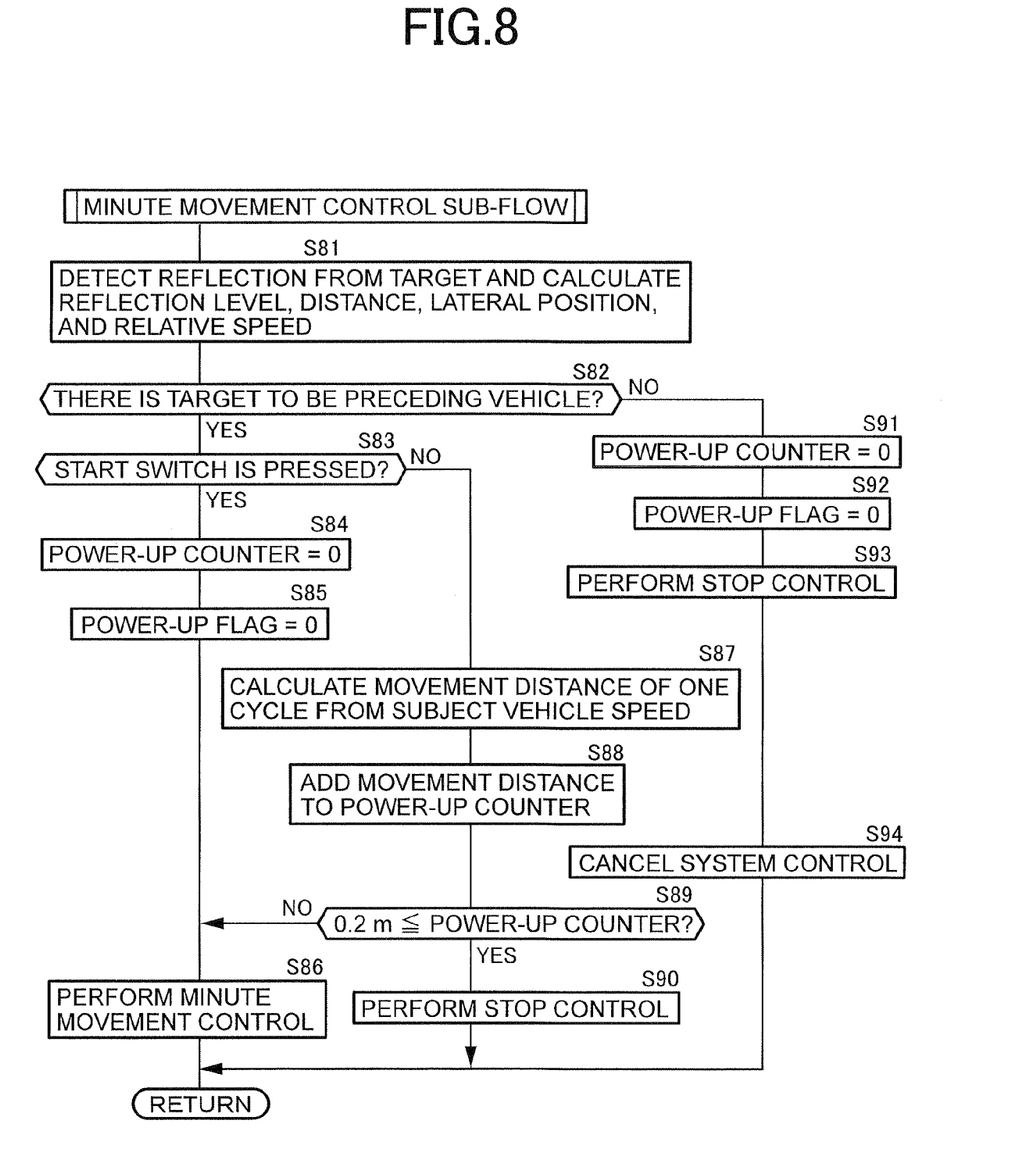
FIG. 8 is a flowchart of a subroutine of Step S58 from the main routine shown in FIG. 6.

In Step S81 of FIG. 8 showing details of Step S58 (minute movement control sub-flow), a reflected wave from a target vehicle is detected by the radar device Sa, and a reflection level, a distance, a lateral position, and a relative speed are calculated. Then, when there is a target vehicle that can be the preceding vehicle in Step S82, and the start switch Sd is pressed in Step S83, the power-up counter is set to the count of 0 in Step S84, the power-up flag is set to "0" in Step S85, and minute movement control is performed in Step S86.

When the start switch Sd is not pressed in Step S83, a movement distance of one cycle (for example, 100 ms) is calculated from the vehicle speed in Step S87, and the movement distance is added to the power-up counter in Step S88. When the count value of the power-up counter is less than 0.2 m, the minute movement control is performed in Step S86, and when the count value of the power-up counter is 0.2 m or more, stop control is performed in Step S90.

When there is no target vehicle that can be the preceding vehicle in Step S82, the power-up counter is set to the count of 0 in Step S91, the power-up flag is set to "0" in Step S92, the stop control is performed in Step S93, and the system control is cancelled in Step S94.

A sub-flow or subroutine (running control routine) of Step S59 of the main routine in FIG. 6 is the same as the subroutine (see FIG. 4) of Step S12 of the main routine in FIG. 2 in the first embodiment, and thus description thereof is omitted to avoid redundancy.

As described above, according to the second embodiment, when the following running control toward the preceding vehicle becomes possible during stoppage, the driver is notified that the following running control is possible, the subject vehicle is slowly advanced a minute distance (for example, 0.2 m), and the output is switched from the power-down mode to the power-up mode with the movement of the subject vehicle. If the driver presses the start switch Sd while the subject vehicle moves 0.2 m, the control shifts to the following running control. If the driver does not press the start switch Sd, the subject vehicle stops after the movement of 0.2 m and returns to the power-down mode. Thus, the driver is notified that the following running control becomes possible, and then the subject vehicle is slowly advanced the minute distance, thereby urging the driver to operate the start switch Sd and allowing a more reliable shift to the following running control.

Figure 9A:
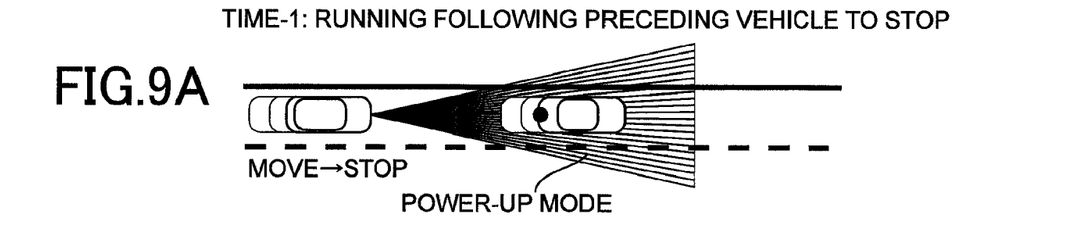
FIGS. 9A-9E illustrate operation at the start of following running control.
Figure 9B:
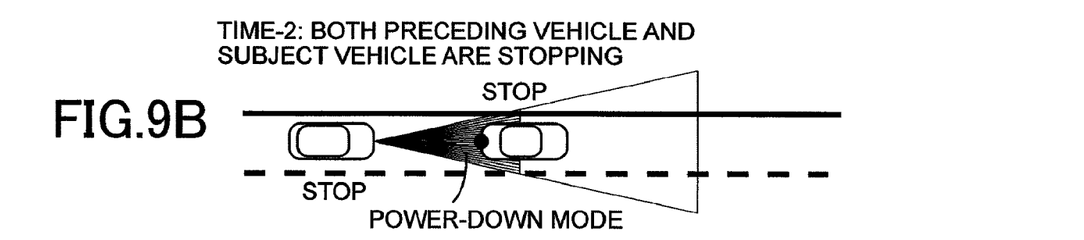
Figure 9C:
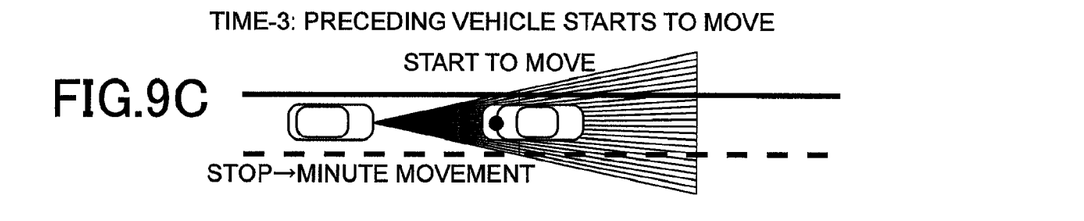
Figure 9D:
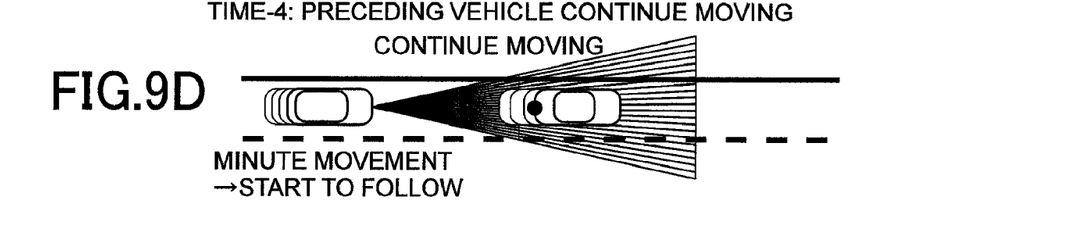
Figure 9E:
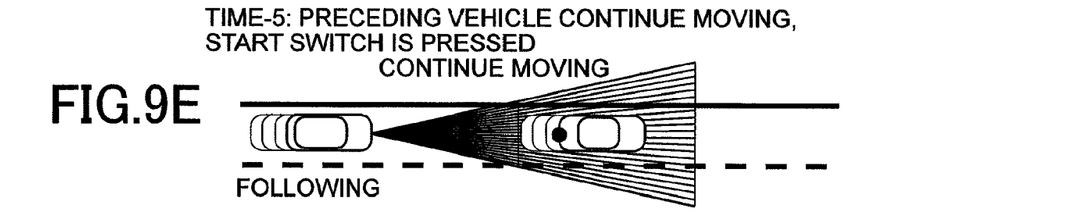

The output of the radar device Sa of the subject vehicle is in the power-up mode until the subject vehicle approaches the stopped preceding vehicle in FIG. 9A and stops, and when the subject vehicle stops in FIG. 9B, the output of the radar device Sa enters the power-down mode. These are the same as in the conventional example described with reference to FIGS. 10A-10E. From this state, when the preceding vehicle starts and the following running control becomes possible, as shown in FIG. 9C, the subject vehicle also immediately advances the minute distance, and the output simultaneously shifts to the power-up mode. The subject vehicle has already been moving when the output shifts from the power-down mode to the power-up mode, and thus the running control system does not violate known legal regulations. Thus, as shown in FIG. 9D, the subject vehicle does not lose sight of the preceding vehicle, and even if there is a slight delay before the driver presses the start switch Sd for the following running control after the start of the preceding vehicle, pressing the start switch Sd while the subject vehicle moves 0.2 m allows a reliable shift to the following running control toward the preceding vehicle, as shown in FIG. 9E.

The embodiments of the present invention have been described, but the present invention is not limited to the embodiments, and various design choices may be made without departing from the present invention described in claims.

For example, in the embodiments, it is detected that the subject vehicle is in the stop state on the basis of the outputs of the vehicle speed sensor Sb and the yaw rate sensor Sc, but the yaw rate sensor Sc is not essential.

Also, in the embodiments, the driver's intension to shift to the following running control is detected by the start switch Sd, but may be detected by the driver's depression of an accelerator pedal.

What is claimed is:

1. A running control system for a vehicle comprising:
   a radar device mounted in a subject vehicle which emits a laser beam to detect a distance between the subject vehicle and a preceding vehicle located forward of the subject vehicle in an advancing direction of the subject vehicle;
   a vehicle speed sensor which detects a vehicle speed of the subject vehicle;
   transmission output control means which sets a laser beam intensity transmission output of the radar device to a stopping time transmission output lower than a running time transmission output when the detected vehicle speed of the subject vehicle is equal to or less than a predetermined value that indicates a substantially stopped state;
   following running control means which performs following running control toward the preceding vehicle based on a detection result by the radar device; and
   notification means which notifies an occupant of the subject vehicle that the following running control is possible when the radar device detects an increase in the distance between the subject vehicle and the preceding vehicle during stoppage of the subject vehicle, or when the distance between the subject vehicle and the preceding vehicle detected by the radar device during stoppage of the subject vehicle is greater than a predetermined value,
   wherein the transmission output control means increases the laser beam intensity transmission output of the radar device to be higher than the stopping time transmission output after notification by the notification means.

2. The running control system for a vehicle according to claim 1, wherein the following running control means performs minute distance movement control to advance the subject vehicle a minute distance when the notification means performs the notification, and the transmission output control means increases the laser beam intensity transmission output of the radar device to be higher than the stopping time transmission output during the minute distance movement control.

3. The running control system for a vehicle according to claim 1, wherein the system further comprises detection means for detecting a command operation for starting the following running control by the occupant of the subject vehicle, and the following running control means starts the following running control toward the preceding vehicle when the command operation for starting the following running control by the occupant is detected within a predetermined time from the notification by the notification means.

4. The running control system for a vehicle according to claim 2, wherein the system further comprises detection means for detecting a command operation for starting the following running control by the occupant of the subject vehicle, and the following running control means starts the following running control toward the preceding vehicle when the command operation for starting the following running control by the occupant is detected within a predetermined time from the notification by the notification means.

5. The running control system for a vehicle according to claim 3, wherein the transmission output control means sets the laser beam intensity transmission output of the radar device to the stopping time transmission output when the command operation for starting the following running control by the occupant is not detected within the predetermined time from the notification by the notification means.

6. The running control system for a vehicle according to claim 4, wherein the transmission output control means sets the laser beam intensity transmission output of the radar device to the stopping time transmission output when the command operation for starting the following running control by the occupant is not detected within the predetermined time from the notification by the notification means.

7. The running control system for a vehicle according to claim 2, wherein the transmission output control means sets the laser beam intensity transmission output of the radar device to the stopping time transmission output at the finish of the minute distance movement control, when the command operation for starting the following running control by the occupant is not detected during the minute distance movement control by the following running control means.

8. A running control system for a vehicle comprising:
   a radar device mounted in a subject vehicle which emits a laser beam to detect a distance between the subject vehicle and a preceding vehicle located forward of the subject vehicle in an advancing direction of the subject vehicle;
   a vehicle speed sensor which detects a vehicle speed of the subject vehicle;
   a transmission output controller which sets a laser beam intensity transmission output of the radar device to a stopping time transmission output lower than a running time transmission output when the detected vehicle speed of the subject vehicle is equal to or less than a predetermined value that indicates a substantially stopped state;
   a following running controller which performs following running control toward the preceding vehicle based on a detection result by the radar device; and a notifying device which notifies an occupant of the subject vehicle that the following running control is possible when the radar device detects an increase in the distance between the subject vehicle and the preceding vehicle during stoppage of the subject vehicle, or when the distance between the subject vehicle and the preceding vehicle detected by the radar device during stoppage of the subject vehicle is greater than a predetermined value, wherein the transmission output controller increases the laser beam intensity transmission output of the radar device to be higher than the stopping time transmission output after notification by the notifying device.

9. The running control system for a vehicle according to claim 8, wherein the following running controller performs minute distance movement control to advance the subject vehicle a minute distance when the notifying device performs the notification, and the transmission output controller increases the laser beam intensity transmission output of the radar device to be higher than the stopping time transmission output during the minute distance movement control.

10. The running control system for a vehicle according to claim 8, wherein the system further comprises a detector for detecting a command operation for starting the following running control by the occupant of the subject vehicle, and the following running controller starts the following running control toward the preceding vehicle when the command operation for starting the following running control by the occupant is detected within a predetermined time from the notification by the notifying device.

11. The running control system for a vehicle according to claim 9, wherein the system further comprises a detector for detecting a command operation for starting the following running control by the occupant of the subject vehicle, and the following running controller starts the following running control toward the preceding vehicle when the command operation for starting the following running control by the occupant is detected within a predetermined time from the notification by the notifying device.

12. The running control system for a vehicle according to claim 10, wherein the transmission output controller sets the laser beam intensity transmission output of the radar device to the stopping time transmission output when the command operation for starting the following running control by the occupant is not detected within the predetermined time from the notification by the notifying device.

13. The running control system for a vehicle according to claim 11, wherein the transmission output controller sets the laser beam intensity transmission output of the radar device to the stopping time transmission output when the command operation for starting the following running control by the occupant is not detected within the predetermined time from the notification by the notifying device.

14. The running control system for a vehicle according to claim 9, wherein the transmission output controller sets the laser beam intensity transmission output of the radar device to the stopping time transmission output at the finish of the minute distance movement control, when the command operation for starting the following running control by the occupant is not detected during the minute distance movement control by the following running controller.

* * * * *